(12) United States Patent
Rushing et al.

(10) Patent No.: US 10,954,161 B2
(45) Date of Patent: Mar. 23, 2021

(54) PERFORMANCE GRADE ASPHALT REPAIR COMPOSITION

(71) Applicant: United States of America as Represented by The Secretary of The Army, Alexandria, VA (US)

(72) Inventors: John F. Rushing, Clinton, MS (US); Webster C. Floyd, Jackson, MS (US); Craig Rutland, Panama City, FL (US); Benjamin C Cox, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 895 days.

(21) Appl. No.: 15/265,507

(22) Filed: Sep. 14, 2016

(65) Prior Publication Data
US 2018/0072625 A1    Mar. 15, 2018

(51) Int. Cl.
| C04B 26/26 | (2006.01) |
| H05B 6/10 | (2006.01) |
| C04B 111/00 | (2006.01) |
| C04B 111/72 | (2006.01) |

(52) U.S. Cl.
CPC ............ *C04B 26/26* (2013.01); *H05B 6/106* (2013.01); *C04B 2111/0075* (2013.01); *C04B 2111/00465* (2013.01); *C04B 2111/72* (2013.01); *Y02W 30/91* (2015.05)

(58) Field of Classification Search
CPC .......... C04B 26/26; C04B 2111/00465; C04B 2111/0075; C04B 2111/72; Y02W 30/92; Y02W 30/95

USPC ......................................................... 219/634
See application file for complete search history.

(56) References Cited

U.S. PATENT DOCUMENTS

| 4,066,471 A * | 1/1978 | Burke | .................. C04B 28/342 |
| | | | 106/690 |
| 4,402,749 A * | 9/1983 | Hall | ...................... C04B 28/26 |
| | | | 106/606 |
| 4,431,335 A * | 2/1984 | Evans | ................... E01C 11/005 |
| | | | 404/108 |
| 4,571,860 A * | 2/1986 | Long | ......................... E01C 7/32 |
| | | | 219/201 |
| 5,645,518 A * | 7/1997 | Wagh | ................... B09B 3/0041 |
| | | | 501/155 |
| 7,098,034 B2 * | 8/2006 | He | ......................... G01N 33/42 |
| | | | 436/163 |

(Continued)

*Primary Examiner* — Chee-Chong Lee
(74) *Attorney, Agent, or Firm* — Brian C. Jones

(57) ABSTRACT

The present invention is a system for repairing asphalt. The system includes a discrete quantity of an asphalt repair composition located within a container and an induction heater. The composition is a combination of an asphalt binder, aggregate particles, and induction particles. The average diameter of the induction particles ranges from approximately 10% above to approximately 10% below an average diameter of the aggregate particles used in the composition. The induction heater heats the composition within the container by generating a magnetic field that penetrates the container. The magnetic field creates eddy currents in the induction particles. These eddy currents in turn heat the composition. Because the induction particles are distributed throughout the composition, the composition heats rapidly.

6 Claims, 1 Drawing Sheet

(56) References Cited

U.S. PATENT DOCUMENTS

2009/0117265 A1\* 5/2009 Fosnacht ................ C04B 28/34
427/140

\* cited by examiner

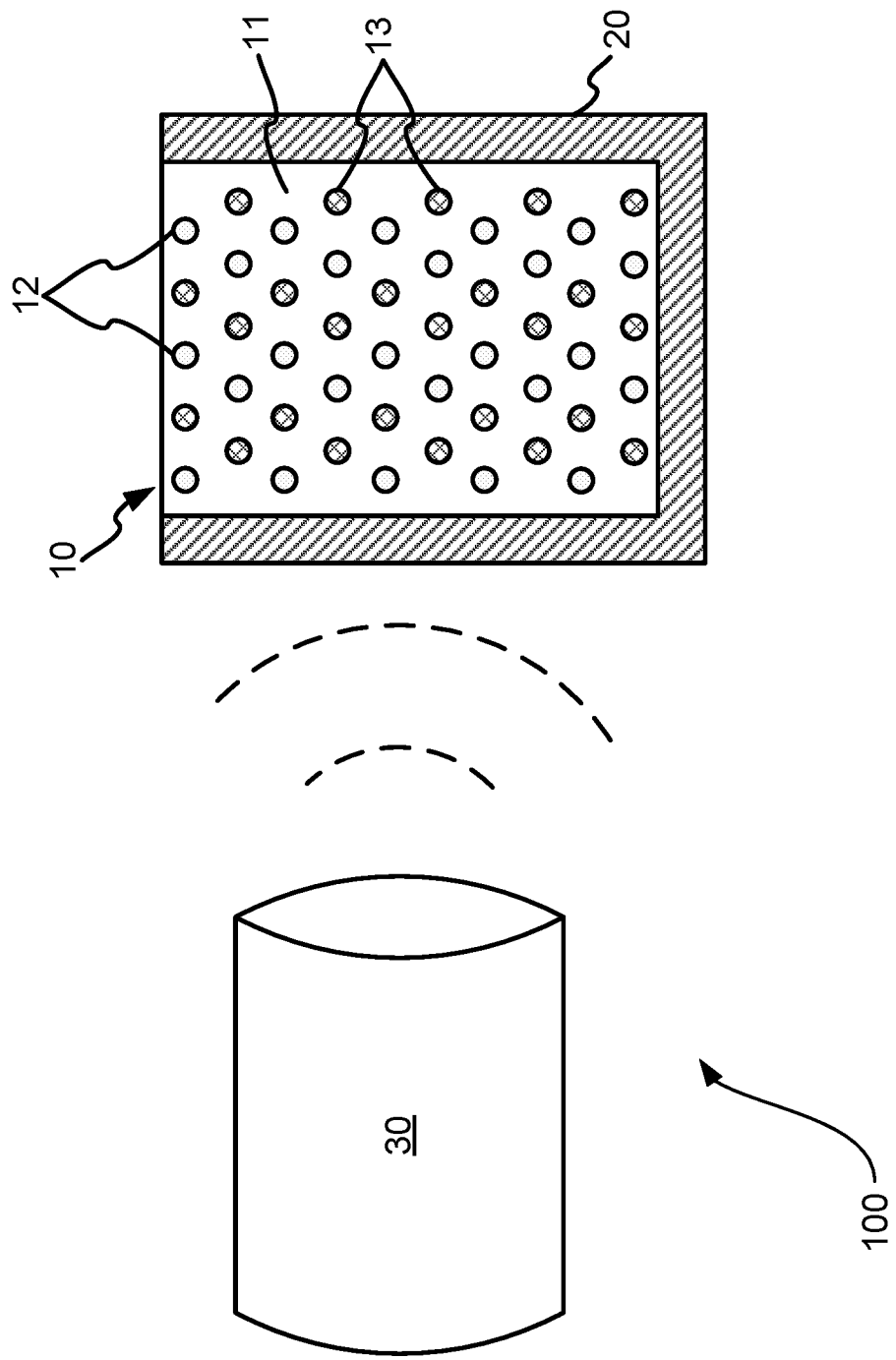

PERFORMANCE GRADE ASPHALT REPAIR COMPOSITION

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of materials and compositions and more specifically to compositions for the structural integrity of roads and runways.

BACKGROUND OF THE INVENTION

Military and civilian runways can incur sudden damage due to the impact of planes. This damage can include potholes, fissures and other surface irregularities. These surface defects can cause accidents when the relatively small wheels of a landing plane come into contact with them. Unanticipated repairs to prevent damage to planes can compromise military missions and disrupt civilian flights due to cancellations and diversions to safer landing areas.

Conventional methods of repairing asphalt concrete runways require heating of asphalt repair composition to allow the material to flow and compact to level the defective area. The heating process takes several hours, during which time runaways must be completely or partially closed. However, due to the time sensitive nature of military airfield traffic, repair crews may not have time for the composition to heat. Various attempts have been made in the art to use cold compositions to save time. However, cold compositions do not compact properly, and areas repaired in this manner develop deep ruts. While cold compositions may provide temporary repairs, they are unsuitable for extended use or use in a high-traffic area.

There is an unmet need for a composition suitable for rapid asphalt repair during mission critical military operations to avoid damage to military planes, and during commercial airline service to avoid damage to civilian planes, as well as injury to passengers.

BRIEF SUMMARY OF THE INVENTION

The present invention is a novel composition for asphalt repair that may be heated rapidly. The composition is a novel combination of an asphalt binder, aggregate particles, and induction particles having a specific structure. The average diameter of the induction particles ranges from approximately 10% above to approximately 10% below an average diameter of the aggregate particles used in the composition. An induction heater heats the composition within a container by generating a magnetic field that penetrates the container. The magnetic field creates eddy currents in the induction particles; these eddy currents in turn heat the composition.

BRIEF DESCRIPTION OF SEVERAL VIEWS OF THE DRAWING(S)

FIG. 1 illustrates an exemplary embodiment of an asphalt repair system.

TERMS OF ART

As used herein, the term "asphalt binder" refers to a semi-solid form of petroleum used to bind aggregate particles to create asphalt concrete.

As used herein, the term "compaction temperature" refers to a temperature that allows a user to create a particular density of an asphalt repair composition. Compaction temperatures can reach approximately 350 degrees F.

As used herein, the term "performance graded asphalt binder" refers to an asphalt binder that meets the specifications of ASTM D6373.

DETAILED DESCRIPTION OF THE INVENTION

FIG. 1 illustrates an exemplary embodiment of an asphalt repair system 100. System 100 includes an asphalt repair composition 10 for application to a pavement defect. Before application, composition 10 is heated in container 20 by induction heater 30.

Asphalt repair composition 10 is made up of an asphalt binder 11, aggregate particles 12, and induction particles 13. When heated, asphalt binder 11 becomes more fluid, allowing a user to densely pack composition 10 into a pavement defect. As asphalt binder 11 cools, it binds aggregate particles 12 and induction particles 13 to the pavement.

Certain embodiments of composition 10 may also include chemical anti-stripping additives, mineral fillers, and/or warm mix additives. Chemical anti-stripping additives are compounds added to asphalt binder to promote adhesion of asphalt binder to aggregate particles. Warm mix additives are mixtures added to asphalt binder to lower an asphalt repair composition's compaction temperature. Mineral fillers are mineral particles suspended in asphalt binder to improve the physical properties of an asphalt repair composition. Mineral fillers may include crushed aggregates, aggregate dust, hydrated lime, hydraulic cements, fly ash, loess, kiln dusts, or combinations thereof. Mineral fillers promote stability in composition 10 by filling in at least part of the voids which may be present in composition 10. Hydraulic cements improve the strength of composition 10. Hydrated lime, fly ash, and kiln dusts promote adhesion of asphalt binder to aggregate particles, as per the chemical anti-stripping additives.

Aggregate particles 12 provide much of the strength to composition 10 after application to a pavement defect. Aggregate particles 12 may include materials such as, but not limited to, gravel, crushed stone, recycled paving materials, slag, synthetic particles, and combinations thereof.

Induction particles 13 make up approximately 1% to approximately 20% of composition 10. In the exemplary embodiment, induction particles 13 make up approximately 5% of composition 10; however, other embodiments may include approximately 1% to approximately 10% of composition 10. Induction particles 13 are similar in size and shape to aggregate particles 12, and make similar contributions to the strength of composition 10.

The average diameter of induction particles 13 ranges from approximately 10% above the average diameter of aggregate particles 12 to approximately 10% below the average diameter of aggregate particles 12. This prevents a size disparity from affecting the strength and utility of composition 10. As a result, induction particles 13 have an average diameter ranging from approximately 0.002 inches to approximately 1 inch. Induction particles 13 may include materials such as, but not limited to, graphite, tungsten, iron alloys, steel alloys, steel production byproducts, or combinations thereof. Steel production byproducts are materials other than steel produced during the process of steelmaking.

Container 20 is a container manufactured from a material that is transparent to a magnetic field; that is, induction heater 30 cannot heat container 20 through induction because the magnetic field passes through container 20 without effect. In the exemplary embodiment, container 20 is made from a non-metallic material capable of being heated to the compaction temperature of composition 10 without being damaged or deformed. In various embodiments, container 20 is a material such as, but not limited to, fiberglass, polymers, and combinations thereof. In the exemplary embodiment, container 20 holds approximately three gallons to approximately five gallons of composition 10.

Induction heater 30 heats composition 10 in container 20 until composition 10 reaches a preferred compaction temperature. Induction heater 30 transmits a magnetic field at a frequency which creates eddy currents in induction particles 13. These eddy currents create heat, which spreads through composition 10 until it reaches a preferred compaction temperature. At this point, a user may apply composition 10 to patch a pavement defect. The frequency of the magnetic field depends on the size of induction particles 13 and the amount of composition 10. Because container 20 is non-responsive to induction, all inductive energy is transmitted to composition 10.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "about," "substantially" or "approximately" as used herein may be applied to modify any quantitative representation that could permissibly vary without resulting in a change in the basic function to which it is related.

What is claimed is:

1. An asphalt repair system, comprising:
   a container, wherein said container encloses a quantity of an asphalt repair composition comprising:
   an asphalt binder,
   a plurality of aggregate particles having an average diameter, and
   a plurality of induction particles, wherein an average diameter of said plurality of induction particles ranges from 10% above said average diameter of said plurality of aggregate particles to 10% below said average diameter of said plurality of aggregate particles; and
   further comprising an induction heater configured to heat said discrete quantity of asphalt repair composition when said discrete quantity of asphalt repair composition is within said container.

2. The system of claim 1, wherein said container is comprised of a material which has a melting point above 350 degrees F.

3. The system of claim 2, wherein said container is manufactured from a material selected from the group consisting of: fiberglass, polymers, and combinations thereof.

4. The system of claim 1, wherein said container is comprised of a material transparent to a magnetic field, selected from the group consisting of:
   fiberglass, polymers, and combinations thereof.

5. The system of claim 1, wherein said container is manufactured from a non-metallic material.

6. The system of claim 1, wherein said container has an interior volume ranging from three gallons to five gallons.

* * * * *